United States Patent
Huang

(10) Patent No.: US 7,075,518 B2
(45) Date of Patent: Jul. 11, 2006

(54) METHOD FOR UPDATING A KEYBOARD CONTROLLER IN A NOTEBOOK COMPUTER

(75) Inventor: Tsung-Sheng Huang, Hsin-Chuang (TW)

(73) Assignee: Insyde Software Corp., Taiwan (TW)

( * ) Notice: Subject to any disclaimer, the term of this patent is extended or adjusted under 35 U.S.C. 154(b) by 712 days.

(21) Appl. No.: 10/192,595

(22) Filed: Jul. 11, 2002

(65) Prior Publication Data

US 2003/0177147 A1    Sep. 18, 2003

(30) Foreign Application Priority Data

Mar. 13, 2002    (TW) ................................ 91104673 A

(51) Int. Cl.
*G09G 5/00*         (2006.01)

(52) U.S. Cl. ........................................ 345/168; 341/22
(58) Field of Classification Search ........ 345/168–169; 717/168; 341/20–35
See application file for complete search history.

(56) References Cited

U.S. PATENT DOCUMENTS 5,805,882 A  *  9/1998  Cooper et al. ................. 713/2

* cited by examiner

*Primary Examiner*—Richard Hjerpe
*Assistant Examiner*—Duc Q. Dinh
(74) *Attorney, Agent, or Firm*—Bacon & Thomas, PLLC

(57) ABSTRACT

A method for updating a keyboard controller in a notebook computer is introduced. The notebook computer has a keyboard controller which further includes a random access memory (RAM) and a read only memory (ROM). Firstly, the updating method has the keyboard controller receive a command for updating the firmware. Then, a keyboard status and a command byte of the keyboard controller are stored into the RAM. The method has the keyboard controller enter into an idle status and/oror proceed to update the ROM. Further, the method determines whether or not the ROM has been completely updated. If the ROM has not been completely updated, the method will wait until the ROM is completely updated. Otherwise, a shutdown identifier is set and the keyboard controller is reset. Thereby, the notebook computer system will not be shut down and the associated keyboard and mouse can still function after the firmware for the keyboard controller is updated under the Windows environment.

6 Claims, 3 Drawing Sheets

METHOD FOR UPDATING A KEYBOARD CONTROLLER IN A NOTEBOOK COMPUTER

BACKGROUND OF THE INVENTION (1) Field of the Invention

The invention relates to an updating method for keyboard controllers, and more particularly to a method that is applied to update the keyboard controller of a notebook computer.

(2) Description of the Prior Art

It is well known that a keyboard controller (KBC) of a notebook computer is used to manage system's commands and data, to receive data sent from a personal system/2 (PS/2) keyboard or a PS/2 mouse, and to forward commands and data to the PS/2 keyboard or mouse in accordance with the system's commands. Also, the keyboard controller of the notebook computer may need to take charge in scanning of a keyboard matrix, controlling, managing and even recharging/discharging of power.

Referring to FIG. 1, a block diagram is used to show one of the internal systems of a conventional notebook computer. A keyboard controller 102 of FIG. 1 is embodied as a microcomputer. As shown, when a central processing unit (CPU) 104 proceeds to update programs or functions stored in the read only memory (ROM) 106 belonged to the keyboard controller 102 other than internal systems of the notebook computer 100, a program for updating the ROM 106 can be downloaded, from a floppy disk or a hard disk 110, to a random access memory (RAM) 108 belonged to the keyboard controller 102 through a low pin count/industry standard architecture (LPC/ISA) bus 112. Also, the keyboard controller 102 is notified to jump to an initial address inside the RAM 108 with respect to the program for updating the ROM 106 for processing a writing (i.e. updating) operation.

Referring to FIG. 2, a block diagram is used to show another internal system of a conventional notebook computer, which presents a shared ROM structure. By comparing FIG. 1 and FIG. 2, the difference is at the ROM. In FIG. 2, the ROM 202 further includes an area 204 corresponding to the keyboard controller 102 and another area 206 corresponding to internal systems of the notebook computer 100. When the CPU 104 proceeds to update the ROM 202, the keyboard controller 102 can be notified to jump to an initial address inside the RAM 108 with respect to a program for updating the ROM 202 for processing a writing (i.e. updating) operation. Alternatively, the keyboard controller 102 may be notified to enter an idle status so as to wait for a wakeup command from the CPU 104 to process the writing operation. Upon such a situation, the program for updating the ROM 202 can determine whether the entire ROM 202 needs to be rewritten or just the keyboard controller's area 204 needs to be rewritten.

In the art, a KBC flash utility can only be executed under the DOS environment, and firmware for the keyboard controller 102 that is stored in the keyboard controller 102 and the ROM 106 would reboot the computer after the flashing (i.e. updating). However, since the keyboard controller of the notebook computer is used to control the ON/OFF of the power, the rebooting after the flashing will accordingly shut down the entire internal systems of the notebook computer. It would meet no problem if the above operation works under the DOS environment. However, under the Windows environment, an abnormal shutdown warning message will show because the aforesaid flashing operation is not coherent with a shutdown procedure organized by the Windows system. Furthermore, while the Windows system is abnormally shut down, the magnetic head of the hard disk will not anchor at a default position so that the lifetime of the hard disk will be substantially shortened. Therefore, it is quite obvious that the KBC flash utility can only be executed with the DOS environment and cannot be performed under the Windows environment.

On the other hand, in the case that the keyboard controller does not control the ON/OFF of the notebook computer, a keyboard and a mouse for the notebook computer may also be invalid after the firmware is flashed under the Windows environment. The reason is that a keyboard and mouse interface default will be automatically switched off while the keyboard controller is rebooted. Hence, even if that the internal systems of the notebook computer are not switched off, the notebook computer would still be shut down for those invalid keyboard and mouse. Accordingly, the abnormal shutdown warning message under the Windows environment will still show.

Further, it is noted that the Windows system does not support the DOS system anymore after the Windows ME and Windows 2000 are introduced into the market. Also, most manufacturers and retailers of the notebook computers provide no support to the DOS systems for their products in the market. Therefore, it can be foreseen that obtaining the DOS system will be very difficult in the future. Thus, the difficulty in updating or flashing upon the KBC flash utility for the notebook computers can be expected.

SUMMARY OF THE INVENTION

Accordingly, it is a primary object of the present invention to provide a method for updating the keyboard controller in a notebook computer, which can carry out updating of the firmware for the keyboard controller under the Windows environment. Also, the internal systems of the notebook computer will not be shut down, and a keyboard and a mouse with the notebook computer can still function after the updating.

In accordance with the present invention, a method for updating a keyboard controller in a notebook computer is introduced. The notebook computer utilizing the method for updating a keyboard controller includes a keyboard controller (KBC). The keyboard controller further includes a random access memory (RAM) and a read only memory (ROM). Firstly, the method of the present invention has the keyboard controller receive a command for updating the KBC (by updating firmware contained in the ROM). Then, a KBC's command byte and a keyboard status of the keyboard controller are stored into the RAM. The method has the keyboard controller enter an idle status and/or proceed to update the ROM. Further, the method determines whether or not the ROM has been completely updated. If the ROM has not been completely updated, the method of the present invention will wait until the ROM is completely updated. On the other hand, if the ROM has been completely updated, a shutdown identifier (shutdown ID) is defined and the keyboard controller is reset. Thereafter, the method proceeds to reboot the notebook computer and/or to reset the keyboard controller, and a variable of the keyboard controller is initialized. Then, the method of the present invention determines whether or not the ROM has been updated. In the case that the ROM is updated, the KBC's command byte and the keyboard status are restored to the keyboard controller from the RAM and the shutdown ID is deleted. On the other hand, in the case that the ROM is not updated, the method can initialize an input/output register. Thereafter, the keyboard controller is ordered to execute a normal procedure.

After the normal procedure is executed, the method carries on to determine whether or not the notebook computer needs to be shut down. If the notebook computer is required to be shut down, then shut down the notebook computer. If the notebook computer needs not to be shut down, the method proceeds to determine whether or not the central processing unit (CPU) of the notebook computer issues another command for updating the KBC. If the CPU has issued the command to update the KBC, the method will go back to the step of having the keyboard controller receive the command for updating the KBC. If the CPU does not issue the command to update the KBC, the method will go back to the step of having the keyboard controller execute the normal procedure.

By providing the present invention, one of various advantages is that the mouse and the keyboard can still function normally after the firmware for the KBC is updated. Upon such an arrangement, the internal systems of the notebook computer can proceed the shutdown and the rebooting in accordance with the normal procedure of the Windows system (i.e., under the Windows environment). Also, during the rebooting after the shutdown of the internal systems in accordance with the present invention, the keyboard controller will be rebooted firstly so that normal operation of the entire systems of the notebook computer can be ensured.

All these objects are achieved by the method for updating a keyboard controller in a notebook computer described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a method for updating a keyboard controller in a notebook computer. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 3:
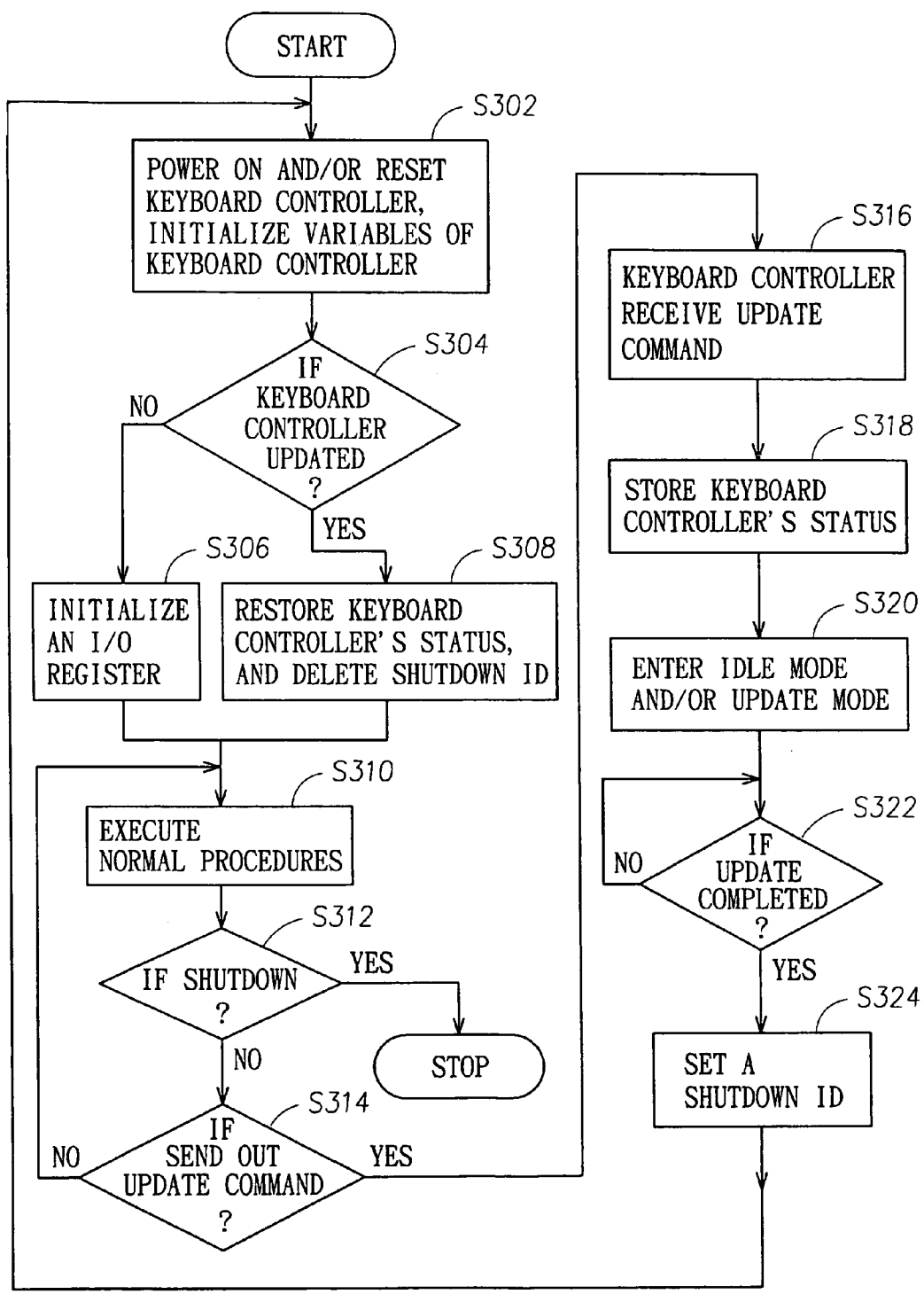
FIG. 3 is a flowchart of a preferred embodiment of the method for updating a keyboard controller in a notebook computer in accordance with the present invention.

Referring now to FIG. 3, a preferred embodiment in accordance with the present invention is shown. Please also refer to FIG. 1. When the notebook computer 100 is turned on and/or the keyboard controller 102 is reset, the keyboard controller 102 will begin to read programs/functions stored in the ROM 106 from a beginning address so as to initialize all registers and variables inside the keyboard controller 102 (S302). At this time, defaults for the keyboard setting and the mouse interface are posed at the OFF status.

Then in step S304, the method will proceed to determine whether or not the firmware for the keyboard controller 102 is updated. If positive, a shutdown identifier (shutdown ID) will be defined and further be stored into the RAM 108.

Therefore, one way to determine if the firmware for the keyboard controller has been updated or not is to judge if the shutdown ID has been set. When the firmware is not updated, the keyboard controller 102 will initialize an input/output (I/O) register (not shown in the drawings) (S306) so as to have the computer peripherals (not shown in the drawings), such as the keyboard, the mouse, etc. function normally. Then, the keyboard controller 102 can execute normal procedures (S310), which includes managing system's commands and data, receiving uploaded data from the PS/2 keyboard and the PS/2 mouse (not shown in the drawings), and forwarding commands and data to the PS/2 keyboard and the PS/2 mouse according to system's demand. On the other hand, when the keyboard controller 102 is updated, the data such as the KBC's command byte, the keyboard status, the mouse status, the power controller parameter and the like will be stored in the RAM 108 first, and after the keyboard controller 102 is rebooted, those data will be restored back to the keyboard controller 102. Upon such an arrangement, the keyboard and the mouse can still function after the keyboard controller 102 is rebooted since the situation that defaults of the mouse and the keyboard are automatically switched off after the keyboard controller 102 is rebooted does not exist any more. Particularly, the restoring step above must be restored by the name of variable, not by the address; further, the I/O register can not be initialized; accordingly, abnormal shutdown under the Windows environment due to a system shutdown can be avoided. Meanwhile, in step S308, the method will delete the shutdown ID so that misjudgment for a fake updating of the firmware can be avoided during booting of the notebook computer 100 or while the keyboard controller 102 is reset. Then, in step S310, the keyboard controller 102 will proceed to execute the normal procedures, such as managing system's commands and data, receiving uploaded data from the PS/2 keyboard and the PS/2 mouse (not shown in the drawings), and forwarding commands and data to the PS/2 keyboard and the PS/2 mouse in accordance with system's demand.

After the keyboard controller 102 executes the normal procedures in step 310, the notebook computer 100 should be turned off or not will be determined in step S312. In the case that the notebook computer 100 needs to be turned off, it will be done so according to normal shutdown procedures provided by the Windows system. On the other hand, if the notebook computer 100 does not need to be turned off, the method will keep going to determine whether or not the CPU 104 has issued a command to update the firmware (S314). If negative, the method will go back to perform Step 310. If the CPU 104 does issue the command to update the firmware, then the method will have the keyboard controller 102 to receive the updating command (S316). At the same time, the keyboard controller 102 will suspend all jobs at hands, and the CPU 104 will inform the keyboard controller 102 of the address and the length of a KBC flash utility to be stored in the RAM 108. Then, the CPU 104 will download the KBC flash utility to the RAM 108 from a floppy disk or a hard disk 110.

However, it is to be noted that in the present invention, before the firmware for the keyboard controller 102 is updated, current data of the keyboard controller 102 such as the KBC's command byte, the keyboard status, the mouse status, the power controller parameter and the like should be stored in the RAM 108 (S318) first. Thereafter, during the rebooting of the keyboard controller 102, those data (i.e., the KBC's command byte, the keyboard status, the mouse status, the power controller parameter and the like) previously stored in the RAM 108 can be restored back to the keyboard controller 102.

In step S320 following step S318, the keyboard controller 102 will enter an idle mode and will not wake up until a wakeup command from the CPU 104 arrives, and/or the keyboard controller 102 can enter an update mode in which the CPU 104 will inform the keyboard controller 102 to jump to the initial address of the KBC flash utility and have the RAM 108 to execute the KBC flash utility for flashing the firmware of the keyboard controller 102. Also, the method will download respective data to the ROM 106, from the floppy disk or the hard disk 110.

Then, the CPU 104 will determine whether or not the firmware of the keyboard controller 102 has already been completely updated. That is to say that the CPU 104 will judge if the KBC flash utility has been done. When the firmware has not been completely updated, the method will keep running the updating of the firmware till it is done. When the firmware has been completely updated, the CPU 104 will inform the keyboard controller 102 of the completion and define a shutdown ID to be stored in the RAM 108 (S324). Finally, the method will go back to step S302 as shown in FIG. 3.

Figure 1:
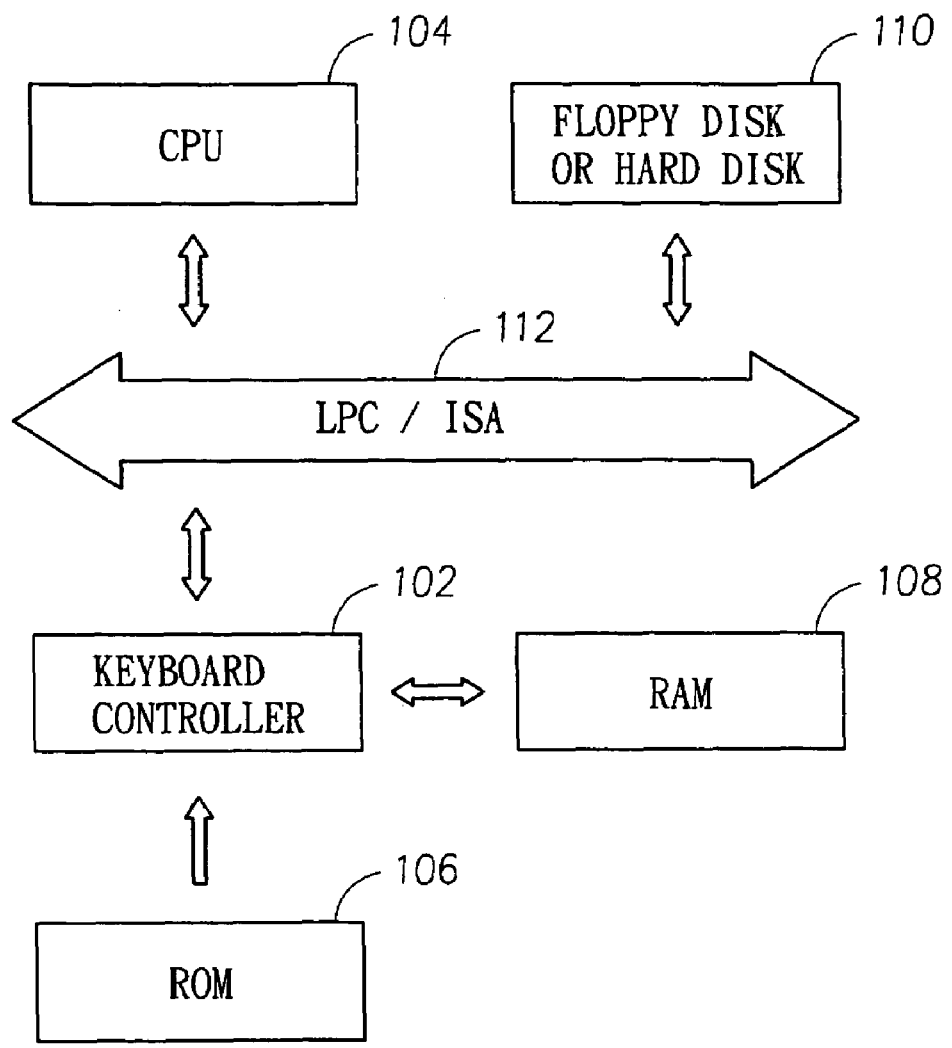
FIG. 1 is a block diagram for an internal system of a conventional notebook computer.
Figure 2:
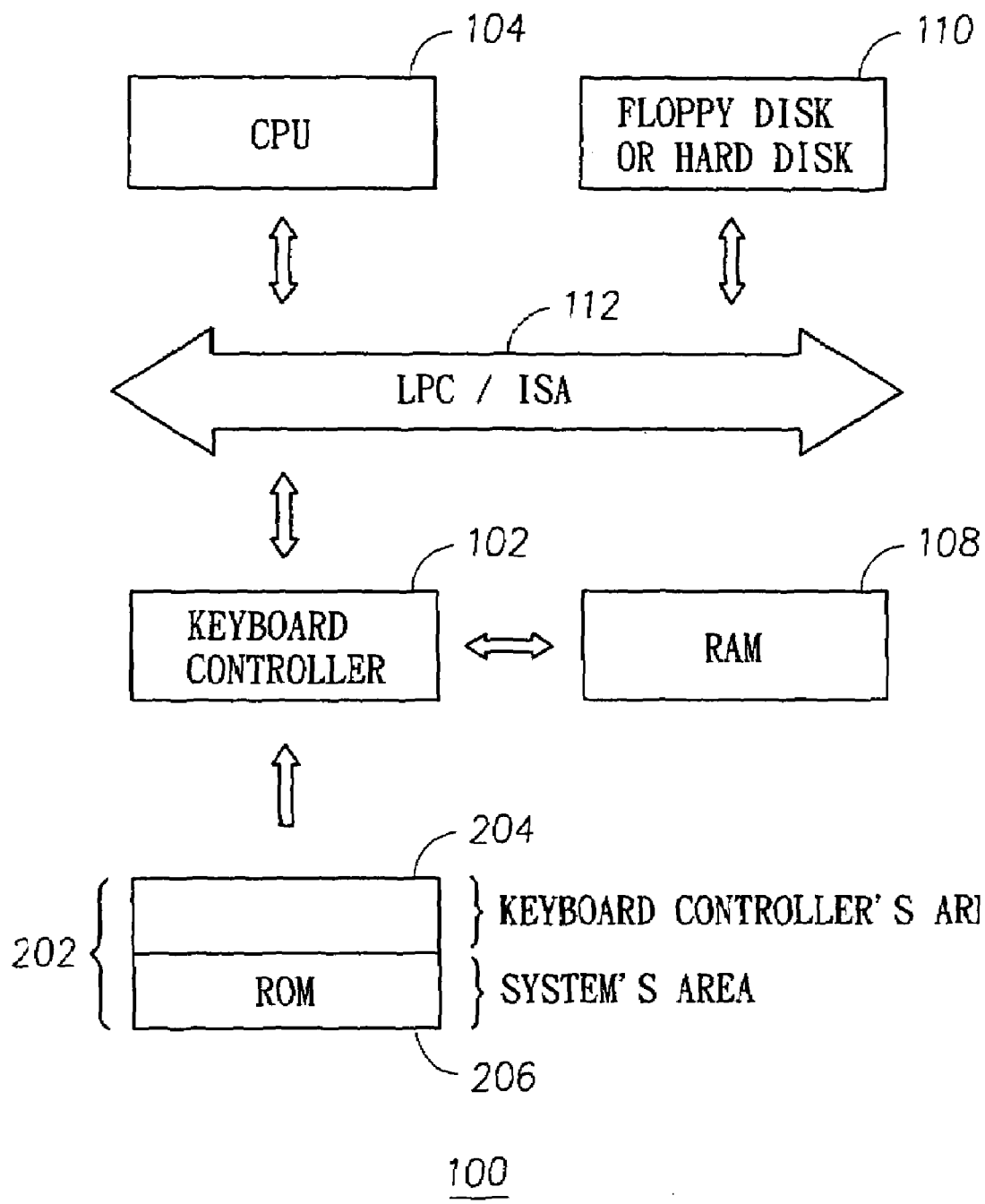
FIG. 2 is a block diagram for another internal system of a conventional notebook computer.

In the present invention, the flowchart of FIG. 3 can also be applied to the framework provided in FIG. 2. It is noted that the difference between FIG. 1 and FIG. 2 is the structure of the keyboard controller 102. In FIG. 2, the ROM allocated to the keyboard controller 102 is located in the ROM 202 for the system. In this aspect, the KBC flash utility can be targeted to the entire ROM 202, or to a portion of ROM 204 that is allocated only to the keyboard controller 102 as shown in FIG. 2. Also, the writing, i.e. the updating or flashing, of the ROM 202 is controlled by the CPU 104, and the keyboard controller 102 is posed at the idle mode. The keyboard controller 102 will perform the rebooting as soon as the wakeup command of the CPU 104 arrives. Yet, any other procedure for the structure of FIG. 2 will be the same as that of FIG. 1 which has been described in details already.

By providing the present invention, one of various advantages is that the mouse and the keyboard can still work normally after the firmware for the keyboard controller is updated. Upon such an arrangement, the internal systems of the notebook computer can proceed the shutdown or the rebooting in accordance with the normal procedure of the Windows system (i.e., under the Windows environment). Also, during the rebooting after the shutdown of the internal systems, the keyboard controller of the present invention will be rebooted firstly so that normal operation of entire systems of the notebook computer can be ensured.

While the present invention has been particularly shown and described with reference to a preferred embodiment, it will be understood by those skilled in the art that various changes in form and detail may be without departing from the spirit and scope of the present invention.

I claim:

1. A method for updating a keyboard controller in a notebook computer, the notebook computer including a keyboard controller (KBC) which further includes a random access memory (RAM) and a read only memory (ROM), the method comprising the steps of:
   (a) having the KBC receive a command for updating the KBC;
   (b) upon receipt of said command, storing KBC status including a command byte and a keyboard status into the RAM;
   (c) having the KBC enter into an idle status and/or proceed to update the ROM;
   (d) determining whether or not the ROM has been completely updated;
   (e) waiting for the ROM to be completely updated, in the case that the ROM has not been completely updated;
   (f) when the ROM has been completely updated, setting and storing a shutdown identifier (shutdown ID) and resetting the KBC;
   (g) rebooting the notebook computer and/or resetting the KBC, and then initializing a variable of the KBC;
   (h) checking said shutdown ID and determining whether or not the ROM has been updated;
   (i) if the ROM has been updated, restoring the KBC's command byte and the keyboard status to the KBC from the RAM and deleting the shutdown ID;
   (j) if the ROM has not been updated, initializing an input/output register;
   (k) having the KBC execute a normal procedure;
   (l) determining whether or not the notebook computer needs to be shut down;
   (m) shutting down the notebook computer, in the case that the notebook computer needs to be shut down; and
   (n) determining whether or not a central processing unit (CPU) of the notebook computer issues another command for updating the KBC, in the case that the notebook computer needs not to be shut down; if positive, going to step (a); and if negative, going to step (k).

2. The method for updating a keyboard controller in a notebook computer according to claim 1, wherein said KBC is a microprocessor.

3. The method for updating a keyboard controller in a notebook computer according to claim 1, wherein said ROM to be updated is the system's ROM of said notebook computer.

4. The method for updating a keyboard controller in a notebook computer according to claim 1, wherein said step (b) further includes that a mouse status and a power controller parameter of said KBC are also stored into said RAM.

5. The method for updating a keyboard controller in a notebook computer according to claim 1, wherein said shutdown ID is checked in step (d).

6. The method for updating a keyboard controller in a notebook computer according to claim 1, wherein said step (i) further includes that a mouse status and a power controller parameter of said RAM are also restored into said KBC.

* * * * *